United States Patent [19]
Simuttis

[11] Patent Number: 5,876,022
[45] Date of Patent: Mar. 2, 1999

[54] HYDRAULIC BEARING

[75] Inventor: Arnold Simuttis, Bad Kreuznach, Germany

[73] Assignee: Firma Carl Freudenberg, Germany

[21] Appl. No.: 839,661

[22] Filed: Apr. 15, 1997

[30] Foreign Application Priority Data

May 24, 1996 [DE] Germany ............... 196 20 971.4

[51] Int. Cl.⁶ ............... F16F 5/00; F16F 9/00
[52] U.S. Cl. ............... 267/140.13; 267/219; 248/562
[58] Field of Search ............... 267/140.11, 140.12, 267/140.13, 140.14, 140.2, 219, 35; 248/562, 636; 180/300, 312

[56] References Cited

U.S. PATENT DOCUMENTS

| | | | |
|---|---|---|---|
| 4,647,023 | 3/1987 | Ray et al. ............... | 267/140.13 X |
| 4,666,137 | 5/1987 | Hamaekers et al. ............... | 267/140.13 |
| 4,773,634 | 9/1988 | Hamaekers ............... | 267/140.13 X |
| 4,903,951 | 2/1990 | Miyamoto et al. ............... | 267/140.13 |
| 5,029,824 | 7/1991 | LeBeau et al. ............... | 267/140.13 |
| 5,104,100 | 4/1992 | Simuttis ............... | 267/219 X |

FOREIGN PATENT DOCUMENTS

| | | | |
|---|---|---|---|
| 236199 A | 9/1987 | France ............... | 267/140.13 |
| 346227 A | 12/1989 | France ............... | 267/140.13 |
| 596787 A1 | 5/1994 | France ............... | 267/140.13 |
| 3225700C1 | 11/1983 | Germany . | |

Primary Examiner—Robert J. Oberleitner
Assistant Examiner—Pamela J. Lipka
Attorney, Agent, or Firm—Kenyon & Kenyon

[57] ABSTRACT

A hydraulic bearing, having a working chamber filled with a damping fluid and a compensating chamber. The chambers are separated from one another by a dividing wall and are in fluid communication with one another via a damping channel, to damp low-frequency vibrations. The damping channel is formed by two subchannels which, in terms of technical function, are arranged in a series connection. The subchannels are arranged axially on both sides of a diaphragm that is capable of vibrating. The diaphragm forms a component of the dividing wall, and the diaphragm is provided with a channel separation and has at least one opening within the channel separation for fluid communication of the subchannels with one another.

14 Claims, 1 Drawing Sheet

HYDRAULIC BEARING

BACKGROUND OF THE INVENTION

1. Field of the Invention

The present invention relates to a hydraulic bearing having a working chamber filled with a damping fluid and a compensating chamber, wherein these chambers are separated from one another by a dividing wall and which chambers are in fluid communication with one another via a damping channel to damp low-frequency vibrations.

2. Description of the Prior Art

A bearing is shown in German Publication DE 32 25 700 C1. The dividing wall includes a diaphragm of an elastomeric material having partial areas that are moveable independently of one another, and which diaphragm is arranged between gratings.

The diaphragm in the above German publication is held sealingly at its periphery in a nozzle cage, and a damping channel surrounds the diaphragm with radial clearance on the outer peripheral side and thereby has a maximum diameter.

Therefore, the surface of the diaphragm for insulating higher-frequency vibrations is comparatively small.

SUMMARY OF THE INVENTION

The object underlying the present invention is to further develop a hydraulic bearing such that the damping channel for damping low-frequency vibrations has as great a length as possible. Nevertheless, the diaphragm should have as large a surface as possible for insulating higher-frequency vibrations.

To fulfill the objective of the present invention, the damping channel is formed by two subchannels which function and are arranged in a series connection. The subchannels are arranged axially on both sides of the diaphragm, which is capable of vibrating. The diaphragm forms a component of a dividing wall, and the diaphragm is provided with a channel separation and has at least one opening within the channel separation for fluid communication between the subchannels. The diaphragm is preferably made of an elastomeric material. Due to the series connection of the two subchannels, the damping channel has a great length, for damping low-frequency vibrations. Because of the simple design of the dividing wall, it may be produced easily and cost-effectively from the standpoint of economics and production engineering. Because the subchannels are spatially separated from one another by a channel separation, that forms a component of the diaphragm, and are in fluid communication with one another, via the opening within the channel separation, it is possible to shift the damping channel from the periphery of the dividing wall toward the center, to thereby use the areas of the dividing wall on the outer peripheral side to improve the insulation of higher-frequency vibrations. Higher-frequency vibrations are insulated by a greater open diaphragm surface, and the design of the diaphragm lowers the dynamic spring rate. The open diaphragm surface is the hydraulically effective surface of the diaphragm.

The diaphragm for insulating higher-frequency vibrations is arranged between halves of a nozzle cage, in a manner that the diaphragm is capable of vibrating. The halves of the nozzle cage can, for example, be perforated so as to form a lattice. The diaphragm, in the region of its open diaphragm surfaces is movable back and forth in the direction of the introduced vibrations. The halves of the nozzle cage can be made, e.g., of a metallic material.

Each of the subchannels can be configured integrally and continuously with one half of the nozzle cage. Because of this feature, the hydraulic bearing has a design with few parts and can be easily assembled. In addition, the manufacture of the hydraulic bearing is thereby simplified.

Each of the subchannels has a groove-shaped crosssection that is open axially in the direction of the diaphragm. The front-side ends of the subchannels and the channel separation of the diaphragm are sealingly braced against each other under axial prestressing. In such an embodiment, it is advantageous if the diaphragm is made of an elastomeric material, since no secondary, auxiliary sealing agent is then needed to seal the subchannels. The halves of the nozzle cage, as well as the subchannels integrally joined to them, can be made, e.g., by the injection molding of an aluminum alloy. Because of the simple geometry of the structural members, this is possible without difficulty.

The channel separation can be provided with an annular, first reinforcement. The elastic flexibility of the diaphragm is thereby further reduced in the region of the channel separation and manifestations of relaxation are prevented.

The subchannels can be constructed as mirror images with respect to the diaphragm. The manufacture of the nozzle cage is thereby further simplified, because the same structural elements can be used for both halves of the nozzle cage.

The ratio of the radial extension of the dividing wall to the radial extension of the subchannels is at least 1.5. The radial extension of the dividing wall is the greatest diameter of the dividing wall within the working chamber, and the radial extension of the subchannels is the average diameter of the damping channel. Such a ratio ensures that the open diaphragm surface is greater than the crosssection, which substitutes for a piston, of the spring element that is joined to the supporting bearing and, with the dividing wall, bounds the working chamber. The spring element is ring-shaped, hollow and conical.

Preferably, the subchannels surround a central region of the diaphragm, and the central region has a lesser thickness than the channel separation. It is advantageous that only the channel separation of the diaphragm has a comparatively great thickness, to reliably seal the subchannels relatively to each other, and that the subchannels sealingly contact the channel separation under elastic prestressing. The central region of the diaphragm enclosed by the subchannels, as well as, the partial areas of the diaphragm which surround the subchannels on the outside, together form the open diaphragm surfaces which are responsible for insulating higher-frequency vibrations. Due to their comparatively reduced thickness—relative to the channel separation—the open diaphragm surfaces are particularly flexible in the direction of the introduced vibrations, so that excellent insulation of higherfrequency vibrations results.

The central region can be provided with at least one pressure relief valve. The pressure relief valve can be, e.g., a section produced essentially without the removal of material. Thus, sudden stresses having great amplitudes do not lead to dangerous pressure peaks within the bearing. The pressure relief valve brings about a quick equalization of pressure between the working chamber and the compensating chamber, which compensating chamber is variable in volume.

Radially outside the channel separation, the diaphragm can have a thickness which corresponds to the thickness of the central region, and can be surrounded on the outer periphery by the nozzle cage with clearance all around. In this manner, the insulation of higher-frequency vibrations is further improved since, given the smallest paths, the diaphragm virtually does not harden.

In the radial direction between the subchannels and the nozzle cage on the outer peripheral side, the diaphragm can be provided with at least one toroidal, first thickening extending in the circumferential direction, the first thickening being overlapped in the radial direction by strip-shaped second thickenings. The first and the second thickenings are preferably arranged axially on both sides of the diaphragm, the second thickenings being distributed uniformly in the circumferential direction, and being adjacent to one another with circumferential clearance. A diaphragm profiled in this manner forms a soft, progressive resistance upon the introduction of low-frequency vibrations. The strong nonlinearity of the expanding elastic properties of the diaphragm prevents rattling caused by the diaphragm striking against the nozzle cage.

To increase the rigidity of the diaphragm in the region of the thickenings, the diaphragm can be strengthened by a second reinforcement.

BRIEF DESCRIPTION OF THE DRAWING

The hydraulic bearing according to the invention is explained in more detail with the aid of the drawing, which shows an embodiment of the present invention in axial cross-section.

DETAILED DESCRIPTION OF THE INVENTION

Figure 1:
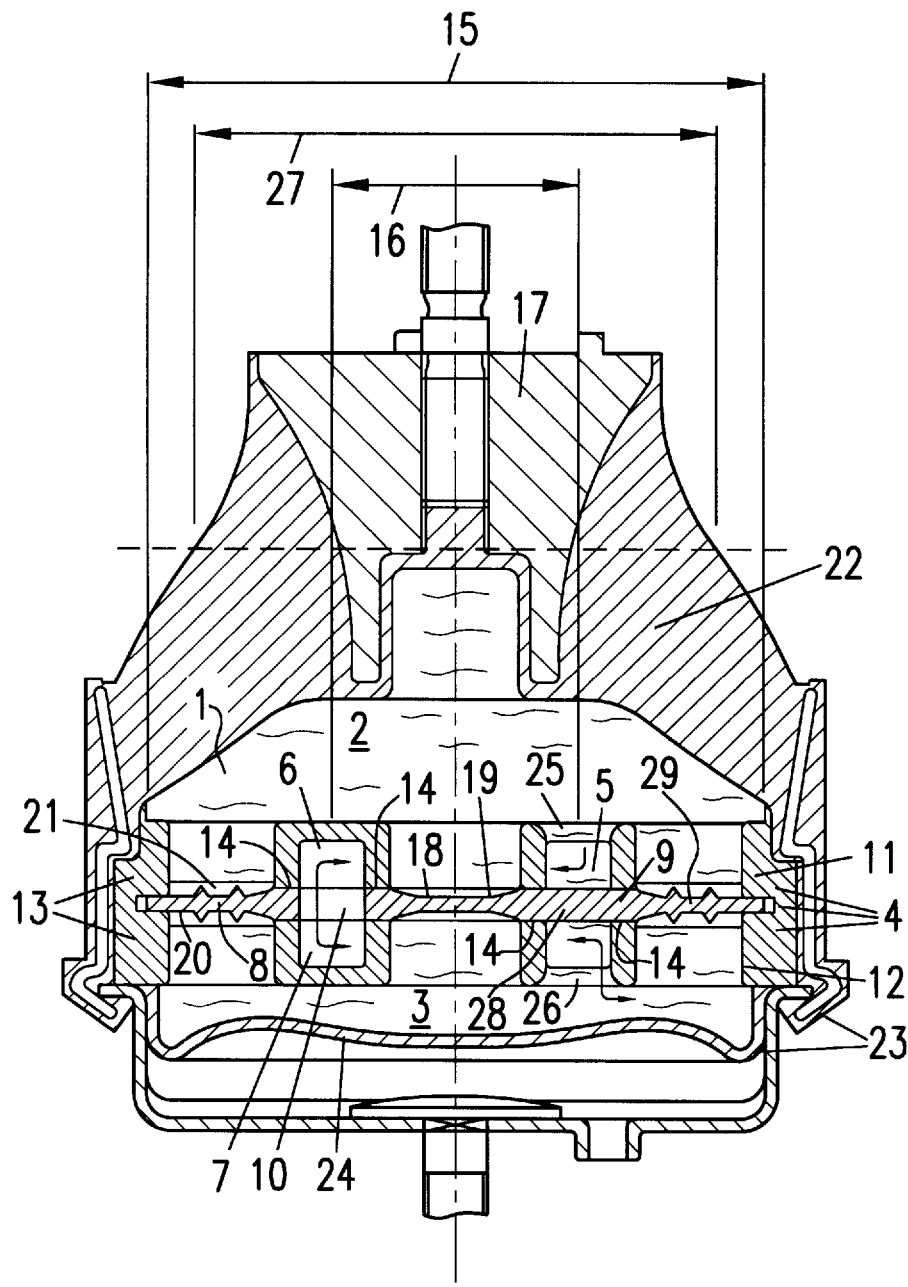

In the drawing, an exemplary embodiment of a hydraulic bearing is shown in cross-sectional representation. The bearing includes a bearing member 17 and an annular, conical spring element 22, as well as a supporting bearing 23. The spring element is made of an elastomeric material and is vulcanized to bearing member 17 and supporting bearing 23. The hydraulic bearing has a working chamber 2 filled with a damping fluid 1 and a compensating chamber 3. The compensating chamber 3 receives, essentially without changes in pressure, damping fluid 1 displaced from working chamber 2. Working chamber 2 is bounded by bearing member 17, spring element 22 and dividing wall 4. Compensating chamber 3 is bounded by dividing wall 4 and a rolling bellows 24 of an elastomeric material. Working chamber 2 and compensating chamber 3 are in fluid communication with one another via a damping channel 5. The damping channel 5 forms a component of dividing wall 4 and includes two subchannels 6, 7. First subchannel 6 is configured integrally and continuously with the first half 11 of nozzle cage 13, and second channel 7 is configured integrally and continuously with the second half 12 of nozzle cage 13. In the embodiment in the drawing, nozzle cage 13 and subchannels 6, 7 are made of injection-molded aluminum. Between the two halves 11, 12 of nozzle cage 13, a diaphragm 8 of an elastomeric material is arranged. The diaphragm has differing thicknesses in the radial direction. To seal the two subchannels 6, 7 relative to each other, diaphragm 8 has a channel separation 9 which is thicker relative to the partial areas of the diaphragm 8 radially adjacent and on both sides of the channel separation 9. Channel separation 9 is provided with an annular first reinforcement 28 and a second reinforcement 29, the second reinforcement 29 overlapping the entire region of thickenings 20, 21 in the radial direction and integrally adjoining the first reinforcement 28 radially on the outside. In view of simple producibility, the advantage of such a design must be stressed. Both reinforcements 28, 29 can also be constructed in two pieces. Reinforcements 28, 29 are made of a tough material, e.g., of metal or a polymer. Subchannels 6, 7 have the shape of an annular groove and are open on the sides facing one another. In the region of their ends 14, subchannels 6, 7 are sealingly pressed under axial prestressing against channel separation 9. For fluid communication between working chamber 2 and compensating chamber 3, first subchannel 6 has an intake port 25, channel separation 9 has an opening 10, and the second channel 7 has an outlet 26 opening into compensating chamber 3.

Both subchannels 6, 7 are arranged in function in a series connection. The ratio of radial extension 15 of dividing wall 4 to the radial extension 16 of subchannels 6, 7 is 2.5 in this exemplary embodiment. The diameters which are the basis of this ratio are formed by the diameter of dividing wall 4, that diameter being located within working space 2, and the average diameter of subchannels 6, 7.

Central region 18 of diaphragm 8 is divided by a section which forms pressure relief valve 19. Central region 18, as well as the partial areas of diaphragm 8 which surround subchannels 6, 7 on the outer peripheral side, are thinner than channel separation 9. It has proven to be particularly advantageous when the ratio of the thickness of channel separation 9 to the thickness of the radially adjacent regions is 2, at most. In this design, the insulation of higher-frequency vibrations is particularly efficient and a reliable sealing of both subchannels relative to one another is assured. Diaphragm 8 is provided axially on both sides with two toroidal, first thickenings 20 extending circumferentially and which are both overlapped in the radial direction by strip-shaped second thickenings 21. First thickenings 20 are closed upon themselves in the circumferential direction. Second enlargements 21 are distributed uniformly circumferentially and are adjacent one another with circumferential clearance. The design of the hydraulic bearing according to the invention makes it possible to lower the dynamic spring rate below the basic spring rate, within a frequency range that lies higher than 180 Hz, and thereby to attain a performance above critical. To that end, it is necessary that the open diaphragm surface be greater than the crosssection 27, which substitutes for a piston, of spring element 22.

Because of thickenings 20, 21, diaphragm 8 forms a soft, progressive resistance in response to the introduction of low-frequency vibrations, while the insulation of higher-frequency vibrations is excellent since, in the region of its bounding on the outer peripheral side, diaphragm 8 has an axial free path within nozzle cage 13 and therefore, given the smallest paths, hardens only negligibly.

I claim:

1. A hydraulic bearing comprising:
   a working chamber filled with a damping fluid;
   a compensating chamber; and
   a dividing wall separating the working chamber and the compensating chamber from one another, the dividing wall comprising a damping channel, the working chamber and the compensating chamber being in fluid communication with one another via the damping channel, the damping channel damping low-frequency vibrations, the damping channel comprising two subchannels arranged in a series connection, the dividing wall further comprising a diaphragm, the subchannels being on axially opposite sides of the diaphragm, the diaphragm being capable of vibrating, the diaphragm comprising a channel separation, the channel separation comprising at least one opening for fluid communication between the subchannels, wherein the subchannels each have a groove-shaded cross-section that is open axially in the direction of the diaphragm and closed axially opposite the direction of the diaphragm at a location of the opening.

2. The hydraulic bearing of claim 1, wherein:

the dividing wall further comprises a nozzle cage, the nozzle cage comprising two halves, and wherein the diaphragm is arranged between the halves of the nozzle cage.

3. The hydraulic bearing of claims 2, wherein:

each of subchannels is made integrally and continuously with one half of the nozzle cage.

4. The hydraulic bearing of claim 1, wherein:

ends of the subchannels and the channel separation are sealed against each other under axial prestressing.

5. The hydraulic bearing of claim 1, wherein:

the channel separation is provided with an annular first reinforcement.

6. The hydraulic bearing of claim 1, wherein:

the subchannels are mirror images of one another relative to the diaphragm.

7. The hydraulic bearing of claim 1, wherein:

a ratio of a radial extension of the dividing wall to a radial extension of the subchannels is at least 1.5.

8. The hydraulic bearing of claim 1, wherein:

the subchannels surround a central region of the diaphragm.

9. The hydraulic bearing of defined by claim 8, wherein:

the central region has a thickness which is less than a thickness of the channel separation.

10. The hydraulic bearing of claim 8, wherein:

the central region comprises at least one pressure relief valve.

11. The hydraulic bearing of claim 8, wherein:

the diaphragm has a thickness radially outside of the channel separation which is essentially equal to the thickness of the central region.

12. The hydraulic bearing of claim 2, wherein:

the diaphragm is surrounded on an outer periphery by the nozzle cage, with clearance all around.

13. The hydraulic bearing of claim 1, wherein:

the diaphragm comprises at least one toroidal, first thickening extending in the circumferential direction, and wherein the first thickening is overlapped in the radial direction by strip-shaped, second thickenings.

14. The hydraulic bearing of claim 13, wherein:

the diaphragm is strengthened by a reinforcement in the area of the thickenings.

* * * * *